(12) United States Patent
Preston et al.

(10) Patent No.: US 9,746,596 B2
(45) Date of Patent: Aug. 29, 2017

(54) MULTI-LED/MULTI-CHIP COLOR MIXING OPTICS

(71) Applicant: FRAEN CORPORATION, Reading, MA (US)

(72) Inventors: James Preston, Malden, MA (US); Brien J. Housand, Worcester, MA (US); Michael Zollers, Burlington, MA (US)

(73) Assignee: Fraen Corporation, Reading, MA (US)

( * ) Notice: Subject to any disclaimer, the term of this patent is extended or adjusted under 35 U.S.C. 154(b) by 0 days.

(21) Appl. No.: 14/441,691

(22) PCT Filed: Nov. 8, 2013

(86) PCT No.: PCT/US2013/069184
§ 371 (c)(1),
(2) Date: May 8, 2015

(87) PCT Pub. No.: WO2014/074842
PCT Pub. Date: May 15, 2014

(65) Prior Publication Data
US 2015/0285980 A1    Oct. 8, 2015

Related U.S. Application Data

(60) Provisional application No. 61/724,130, filed on Nov. 8, 2012.

(51) Int. Cl.
*F21V 7/04* (2006.01)
*F21V 8/00* (2006.01)
(Continued)

(52) U.S. Cl.
CPC .............. *G02B 6/0008* (2013.01); *F21K 9/61* (2016.08); *F21V 7/0033* (2013.01); *F21V 7/0091* (2013.01); *G02B 6/0018* (2013.01)

(58) Field of Classification Search
CPC .......... B60Q 3/002–3/005; B60Q 3/044; F21S 48/115–48/1163; F21S 48/1329;
(Continued)

(56) References Cited

U.S. PATENT DOCUMENTS 5,707,130 A  *  1/1998  Zwick ................. B60Q 1/2696
                                                       362/517
6,015,200 A      1/2000  Ogura
(Continued)

FOREIGN PATENT DOCUMENTS

EP    1416220 A1    5/2004
EP    2363738 A2    9/2011
(Continued)

OTHER PUBLICATIONS

International Search Report, PCT/US2013/069184, mailed Feb. 6, 2014 (5 sheets).

*Primary Examiner* — Anh Mai
*Assistant Examiner* — Steven Horikoshi
(74) *Attorney, Agent, or Firm* — Reza Mollaaghababa; Thomas Engellenner; Pepper Hamilton LLC (57) ABSTRACT

In one aspect, the present invention provides an optic, which comprises a light pipe extending from a proximal end to a distal end about an optical axis, said light pipe being adapted to receive at its proximal end at least a portion of light emitted by a light source. The optic further comprises a central reflector optically coupled to said distal end of the light pipe for receiving at least a portion of the light transmitted through the light pipe and reflecting said received light, a peripheral reflector optically coupled to said central reflector for receiving at least a portion of said reflected light, and an output surface. The peripheral reflec-
(Continued)

tor is configured to redirect at least a portion of the light received from the central reflector to said output surface for exiting the optic.

23 Claims, 8 Drawing Sheets (51) Int. Cl.
*F21V 7/00* (2006.01)
*F21K 9/61* (2016.01)

(58) Field of Classification Search
CPC .............. F21S 48/2237; F21S 48/2262; F21S 48/2271–48/2287; F21S 48/236; F21S 48/225; F21S 48/215; F21S 48/2225; F21S 48/2231; F21S 48/24; F21V 7/0033; F21V 7/0091; G02B 6/008; G02B 5/04; F21K 9/61

USPC ........................................................ 359/834
See application file for complete search history.

(56) References Cited

U.S. PATENT DOCUMENTS

| | | | |
|---|---|---|---|
| 7,178,942 B2* | 2/2007 | Chen | G02B 6/0028 362/231 |
| 2006/0164839 A1 | 7/2006 | Stefanov | |
| 2007/0109791 A1* | 5/2007 | Chinniah | F21S 48/1233 362/334 |
| 2009/0146049 A1* | 6/2009 | Hsieh | F21V 7/0091 250/216 |

FOREIGN PATENT DOCUMENTS

| | | |
|---|---|---|
| WO | 9909349 A1 | 2/1999 |
| WO | 2012036541 A1 | 3/2012 |

* cited by examiner

MULTI-LED/MULTI-CHIP COLOR MIXING OPTICS

FIELD

The present teachings relate generally to optics, lenses and lighting systems and methods, and particularly to such optics, lenses and lighting systems and methods for light mixing and/or color mixing.

INTRODUCTION

Lenses and lighting systems for light sources, such as light emitting diodes, can be utilized in a wide variety of applications. Many lighting applications call for the ability to mix light emitted from a single light source, e.g., to obtain a desired light intensity profile and/or reduce source imaging. Further, in some applications, it is desirable to mix light emitted from multiple sources, e.g., sources producing light of different wavelengths (i.e., colors). It is, however, difficult to produce uniformly mixed light. Many conventional light-mixing systems provide textured surfaces to spread the light from a light source. The efficiency and capabilities of such systems are limited and their illumination characteristics are typically sub-par.

Accordingly, there is a need for improved light-mixing optics, lenses and respective lighting systems and methods.

SUMMARY

The present teachings generally disclose optics and optical systems in which a light pipe is employed for mixing light received from one or more light sources and a combination of a central reflector (herein also referred to in some cases as a fold mirror) and a peripheral reflector is employed for redirecting and shaping the mixed light to form a beam (e.g., a collimated beam) for illuminating a target of interest. While in some embodiments, the reflective surfaces of central and the peripheral reflectors rely on total internal reflection for redirecting incident light, in other embodiments one or more of these reflective surfaces are formed by selective metallization of one or more surfaces of the optic. In some applications, the optics and the optical systems of the invention can be used to mix light emitted by one or more arrays of multicolor light emitting diodes (LEDs) or LED chips to create uniform or nearly uniform light of any color (e.g., white) while achieving narrow beam angles (e.g., FWHM at less than about 15 degrees). In some embodiments, the optics and the optical systems of the invention can be molded from a single piece of plastic, and can be readily tailored to fit a specific LED or LED array and/or mechanical constrains of a specific lighting application. The optics and the optical systems of the invention can provide a variety of output beams. For example, as discussed in more detail below, an output surface of an optic according to the present teachings can comprise a plurality of microlenses, which allow tuning the shape of the output beam.

In one aspect, the present invention provides an optic, which comprises a light pipe extending from a proximal end to a distal end about an optical axis, said light pipe being adapted to receive at its proximal end at least a portion of light emitted by a light source. The optic further comprises a central reflector optically coupled to said distal end of the light pipe for receiving at least a portion of the light transmitted through the light pipe and for reflecting said received light. A peripheral reflector is optically coupled to said central reflector for receiving at least a portion of said reflected light. The optic further comprises an output surface through which light exits the optic. The peripheral reflector is configured to redirect at least a portion of the light received from the central reflector to said output surface for exiting the optic.

In some embodiments, the central reflector is configured to reflect at least a portion of the light received from the light pipe via total internal reflection (TIR). In other embodiments, the central reflector is configured to reflect at least a portion of the light received from the light pipe via specular reflection. Further, in some embodiments, the central reflector is configured to reflect the light received from the light pipe via a combination of TIR and specular reflection.

The lateral reflector can comprise a lateral surface, which is configured to receive at least a portion of the light reflected by the central reflector and to redirect the received light to the output surface for exiting the optic. In some embodiments, the lateral surface is configured to redirect the received light along a direction that is substantially parallel to said optical axis. While in some embodiments the lateral surface is configured to reflect the light incident thereon via TIR, in other embodiments the lateral surface is configured to reflect the incident light via specular reflection or a combination of TIR and specular reflection.

In some embodiments, the lateral surface can further include another reflective surface that is disposed at an angle (typically an acute angle) relative to said lateral surface. This additional reflective surface is configured to receive another portion of light reflected by the central reflector and to redirect the received light via reflection, e.g., via TIR, specular reflection or a combination of TIR and specular reflection, to any of said lateral surface and said output surface. In some embodiments, this additional reflective surface is a substantially flat surface that is positioned substantially perpendicular to the optical axis. The light redirected by this additional reflective surface to the lateral surface can be reflected by the lateral surface toward the output surface for exiting the optic. In some embodiments, the light that is reflected by this additional reflective surface directly toward the output surface propagates in a direction substantially parallel to the optical axis to the output surface.

The central reflector of the optic can comprise a reflective surface that reflects the light incident thereon via TIR, specular reflection or both. In some embodiments, this reflective surface can be in the form of an inverted conical surface whose apex is disposed on the optical axis. In some embodiments, this reflective surface can comprise a plurality of surface undulations (e.g., surface oscillations). The surface undulations can further mix the light received from the light pipe.

In some embodiments, the output surface of the optic comprises a textured surface to cause further mixing of the light rays as they exit the optic. In some embodiments, the output surface of the optic comprises a plurality of microlenses to cause further mixing of the light rays as they exit the optic.

The optic can be employed to mix and redirect light emitted by a plurality of different light sources. Some examples of such light sources comprise, without limitation, a single light emitting diode (LED), a plurality of discrete LEDs, one or more multi-LED chips, among others.

While in some embodiments the optic is formed as a single unitary piece, in other embodiments, the optic can be formed of separated pieces that are assembled together to provide the above functionality.

In a related aspect, an optical system is disclosed, which comprises a light source, and an optic that is coupled to said light source for receiving light therefrom and to redirect the received light, e.g., as a collimated beam. The optic can comprise a light pipe extending from a proximal end to a distal end about an optical axis, said light pipe being adapted to receive at its proximal end at least a portion of light emitted by a light source, a central reflector optically coupled to said distal end of the light pipe for receiving at least a portion of the light transmitted through the light pipe and for reflecting said received light, a peripheral reflector optically coupled to said central reflector for receiving at least a portion of said reflected light, and an output surface. The peripheral reflector is configured to redirect at least a portion of the light received from the central reflector to said output surface for exiting the optic.

In a related aspect, an optic is disclosed, which comprises a light pipe having an input surface for receiving light from a light source and an output surface through which light exits the light pipe. An optical component is optically coupled to said output surface of the light pipe to receive at least a portion of the light exiting the light pipe, said optical component comprising an input surface through which at least a portion of the light exiting the light pipe enters the optical component, a central reflector configured to receive at least a portion of the light entering the optical component and to reflect at least a portion of the received light, a peripheral reflector optically coupled to said central reflector for receiving at least a portion of said reflected light, and an output surface. The peripheral reflector is configured to redirect at least a portion of the light received from the central reflector to said output surface.

The following detailed description in conjunction with the associated drawings, which are described briefly below, further disclose various aspects of the invention.

DETAILED DESCRIPTION

Figure 1A:
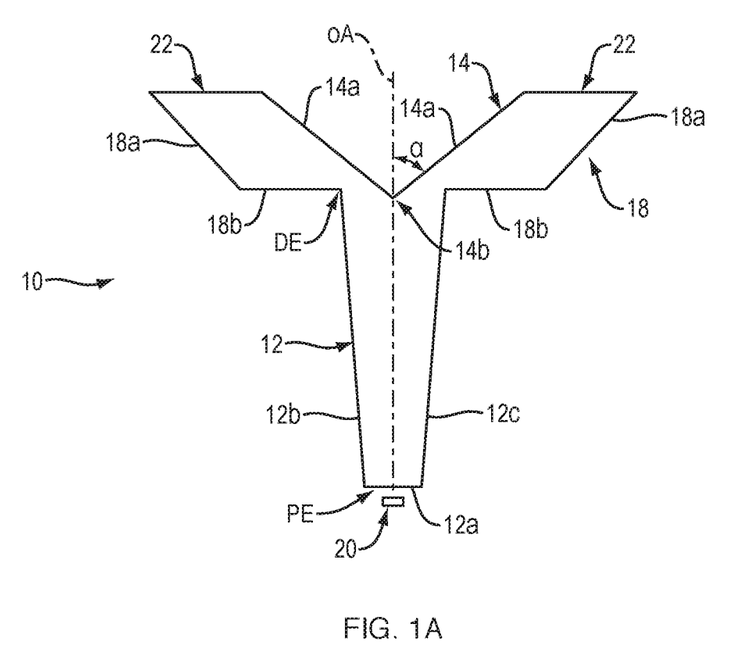
FIG. 1A is a schematic cross-sectional view of an embodiment of an optic according to the teachings of the invention.
Figure 1B:
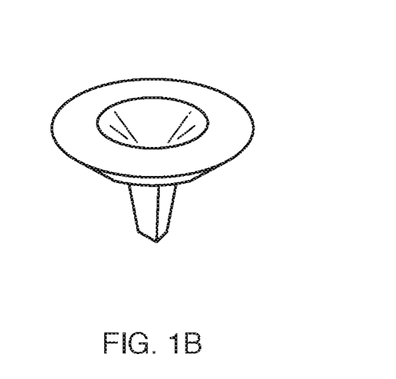
FIG. 1B is a schematic perspective view of the optic shown in FIG. 1A.
Figure 1C:
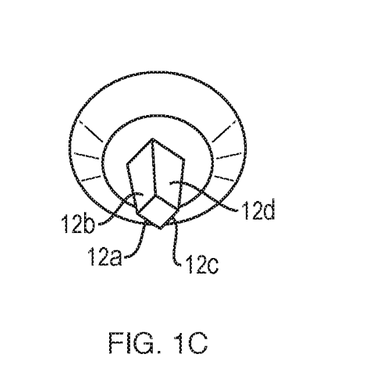
FIG. 1C is another schematic perspective view of the optic shown in FIG. 1A.

FIGS. 1A, 1B, and 1C schematically depict an optic 10 according to an embodiment of the invention, which includes a light pipe 12, a central reflector 14 and a peripheral reflector 18. The light pipe 12 extends between a proximal end (PE) to a distal end (DE) about an optical axis (OA). The light pipe 12 can have a variety of different cross-sectional shapes. In many embodiments, the light pipe 12 has a polygonal cross-sectional shape (in a plane perpendicular to the optical axis (OA)), such as, square, rectangle, hexagonal, etc. In some embodiments, the cross-sectional area of the light pipe at its distal end can be greater than the cross-sectional area at its proximal end. In this exemplary embodiment, the light pipe exhibits a progressively increasing cross-sectional area from its proximal end to its distal end. In other embodiments, the cross-sectional area of the light pipe can be constant from its proximal end to its distal end. The light pipe is adapted to receive at its proximal end, via an input surface 12a, light from one or more light sources 20 that are optically coupled thereto.

A variety of light sources, including incoherent and coherent light sources, can be employed. By way of example, the light source 20 can be a single light emitting diode (LED), a plurality of discrete light emitting diodes, a multi-LED chip, among others.

Many of the light rays entering the light pipe via its input surface 12a undergo multiple reflections at its lateral surfaces (i.e., surfaces 12b, 12c, 12d and 12e) as they propagate along the light pipe toward its distal end. In this embodiment, the light pipe is configured, in a manner known in the art, so that the light rays incident on its lateral surfaces undergo total internal reflection (TIR). For example, the refractive index of the material forming the light pipe and the shapes of the lateral surfaces of the light pipe are chosen such that many, and preferably all, of the light rays incident on those surfaces, as they propagate along the light pipe, would undergo TIR. In some embodiments, the lateral surfaces can be metalized to allow specular reflection of the incident light rays. Further, in some embodiments, the reflection of the light rays incident on the lateral surfaces of the light pipe can be achieved via a combination of specular and total internal reflection.

The multiple reflection of the light rays by lateral surfaces of the light pipe causes the mixing of those rays. Such mixing of the light rays can be advantageous in a variety of lighting applications. For example, in certain applications in which a single light source is employed, such mixing of the light rays can improve intensity homogeneity in a plane perpendicular to the direction of propagation. In certain applications in which light sources of different colors are employed, such mixing of the light rays can provide enhanced color mixing.

With continued reference to FIGS. 1A, 1B, and 1C, the central reflector 14 is optically coupled to the distal end of the light pipe to receive at least a portion of the light transmitted through the light pipe. In this embodiment, the central reflector 14 is in the form of an inverted conical reflective surface 14a whose apex 14b is disposed on the optical axis (OA). In this embodiment the reflective surface 14a is configured, in a manner known in the art, to reflect via TIR the light rays incident thereon via transmission through the light pipe 12. For example, the refractive index of the material forming the optic as well as the shape and configuration of the reflective surface 14b, e.g., the opening angle α, can be selected such that the incident light rays, or at least a substantial portion thereof (e.g., at least about 80% or 90%), would reflect via TIR by the reflective surface 14a. Alternatively, or in addition, the reflective surface 14a can include a metallic coating to effect specular reflection of the incident light rays.

In this embodiment, the reflective surface 14a redirects the incident light rays to the peripheral reflector 18, which includes a peripheral reflective surface 18a that is configured to receive a portion of the light reflected by the reflective surface 14a and another reflective surface 18b positioned at an angle relative to the peripheral reflective surface 18a, which is configured to receive another portion of the light reflected by the reflective surface 14a. In this embodiment, the reflective surface 18b is a substantially flat surface that is positioned perpendicularly relative to the optical axis (OA). The reflective surfaces 18a and 18b redirect the incident light rays, via reflection, to an output surface 22 through which the light rays exit the optic. (The reflective surface 14a is also herein referred to in some cases as a fold mirror as a way of indicating that it redirects the light rays leaving the light pipe away from their propagation direction as they exit the light pipe).

In various embodiments, the optic 12 can be configured such that a substantial portion of light exiting the output surface 22 exhibits a narrow beam angle. For example, the surfaces 18a and 18b can be configured to redirect a substantial portion of the incident light rays towards the output surfaces 22 in a direction that is substantially parallel to the optical axis. In this manner, the peripheral reflector 18 can collimate the light received from the central reflector 14 for exiting the optic through the output surface 22. In some embodiments, for example, the optic 12 can be configured such that the light exiting each output surface 22 can exhibit FWHM at less than about 15 degrees, less than about 10 degrees, or less than about 5 degrees.

In this embodiment, the reflective surfaces 18a and 18b are configured to reflect the incident light, or at least a substantial portion thereof (e.g., more than about 80%, or 90%), via TIR. Alternatively or in addition, a thin metal coating (not shown) can cover at least a portion of the surfaces 18a and 18b to effect specular reflection of the light rays at those surfaces.

Figure 2:
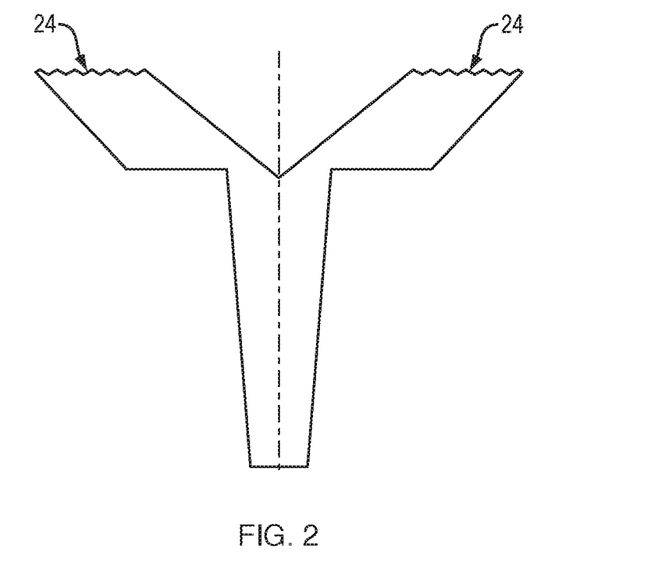
FIG. 2 is a schematic cross-sectional view of an optic according to an embodiment of the invention, which includes a plurality of micro lenses on an output surface thereof.

In this embodiment, the output surface 22 is substantially flat. In other embodiments, the output surface can be textured and/or include a plurality of microlenses, e.g., to cause additional mixing of the light rays as they exit the optic therethrough. By way of example, FIG. 2 schematically depicts such an embodiment in which the output surface 22 comprises a plurality of microlenses 24. In color mixing applications, the microlenses can improve color mixing. Further, the microlenses can be employed to achieve greater output beam angles or create an elliptical output beam.

Figure 3:
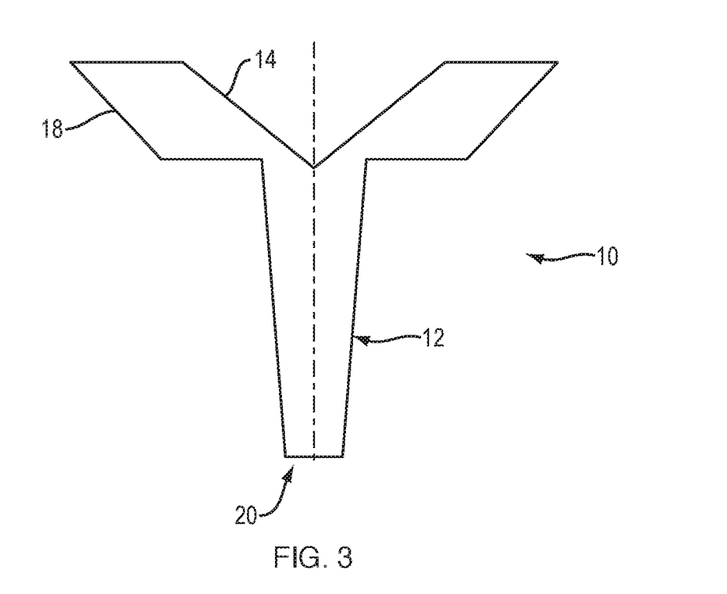
FIG. 3 shows theoretically calculated paths of a plurality of light rays emitted by a source through an embodiment of an optic according to the teachings of the invention.

Referring to FIG. 3, in use, the optic 10 can receive light at its proximal end from the light source 20. The received light is transmitted through the light pipe 12 and is reflected by the central reflector 14 to the peripheral reflector 18, which in turn redirects the light as a collimated set of rays toward the output surface 22 for exiting the optic. In this manner, the light pipe 12 homogenizes the light output of the source 20, e.g., an LED array, while the central reflector 14 and the peripheral collimating reflector 18 form the beam shape. As discussed otherwise herein, the central reflector 14 and peripheral reflector 18 can be configured such that the light exiting each output surface 22 can exhibit FWHM at less than about 15 degrees, less than about 10 degrees, or less than about 5 degrees.

The optic 10 can be made in a variety of different sizes, shapes and aspect ratios, e.g., based on a particular lighting application for which the optic is intended. For example, the sizes of the input and the output surfaces 12a and 22, the length of the light pipe, the lengths and the diameters of the central and the peripheral reflectors as well as the profiles of their reflective surfaces can be adjusted, e.g., based on an application for which the optic is intended. By way of example, the ratio of the length (L) of the light pipe relative to the diameter ($D_{input}$) of the its input surface can be in a range of about 3:1 to about 1:1. The ratio of the diameter ($D_{output}$) of the output surface 22 of the optic relative to $D_{input}$ can be selected, e.g., at least partially based on the desired level of collimation of the light rays exiting the optic. For example, in some embodiments in which a collimation characterized by a divergence of less than about 10 degrees is desired, the ratio of $D_{output}$ relative to $D_{input}$ can be in a range of about 10:1 to about 20:1.

In this embodiment, the optic 10 is fabricated as a single integral unit. A variety of materials and manufacturing techniques can be employed to form the optic 10. Some examples of suitable materials include, without limitation, PMMA, polycarbonate, glass, silicon, and any optically clear material. Some examples of suitable manufacturing techniques include, without limitation, injection molding. While in many embodiments different parts of the optic are formed of the same material, in other embodiments different materials may be used to form different parts of the optic. For example, one material can be employed to form the light pipe while another material is used to form the remainder of the optic.

Figure 4:
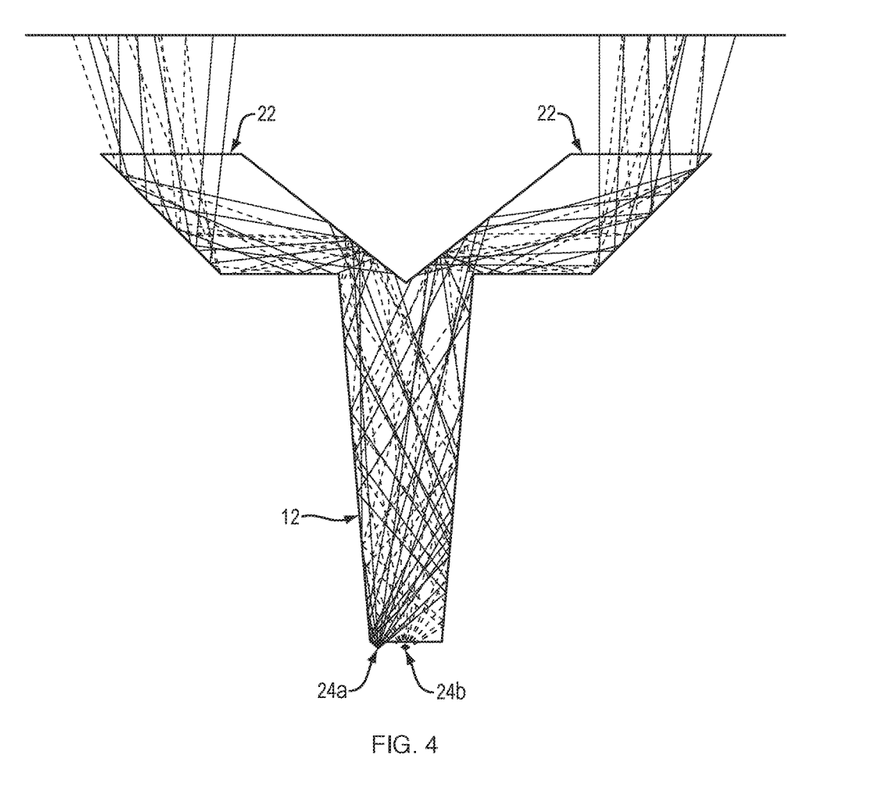
FIG. 4 is schematic cross-sectional view of an optic according to the teachings of the invention, which is coupled to two light sources for mixing the light emitted thereby and shaping the mixed light as a collimated beam.

FIG. 4 schematically depicts that the optic 10 can be employed with multiple light sources (in this embodiments two light sources 24a and 24b) to mix the light emitted by those sources and direct the mixed light as a substantially collimated beam out of the optic. In this embodiment, the light sources 24a and 24b generate light of different colors. The passage of the light rays emitted by the sources 24a and 24b through the light pipe 12 causes their mixing (in this illustration, the light rays associated with one source are shown by solid lines while the light rays associated with the other source are shown by broken lines). The central and the peripheral reflectors, in turn, redirect the mixed light transmitted through the light pipe out of the optic, via the output surface 22, as a substantially collimated beam. In this manner, the optic 10 can be utilized for color mixing applications, among others.

Figure 5:
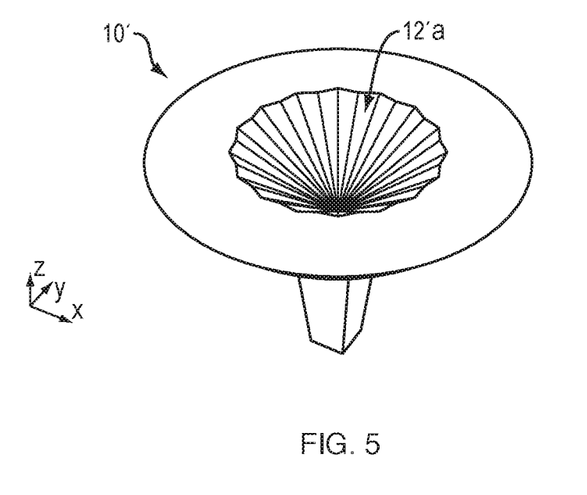
FIG. 5 is a top schematic perspective view of an optic according to an embodiment of the invention, which comprises a central undulating reflective surface.

In some embodiments, the central reflector of the optic 10 discussed above can have an undulating reflective surface. For example, as shown schematically in FIG. 5, such an optic 10' can include a central oscillating reflective surface 12'a (the remainder of the optic in this example is identical to the optic 10 discussed above). The oscillations of the reflective surface 12' can cause further mixing of the light rays reflected thereby. By way of example, such additional mixing of the light rays can improve color mixing in lighting applications.

Figure 6:
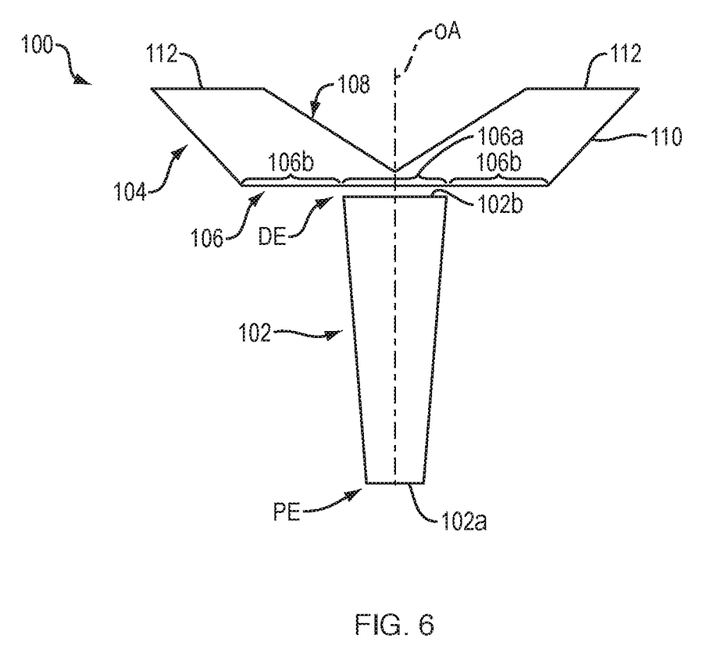
FIG. 6 is a schematic cross-sectional view of an optic according to an embodiment of the invention, which includes a plurality of separate optical components assembled to provide cooperatively the optic's functionality.

While in some embodiments the optic is formed as a single unitary piece (such as the optic 10 discussed above), in other embodiments the optic can be formed of separated pieces (separate optical components) that can be assembled relative to one another so as to cooperatively provide the optic's functionality. By way of example, FIG. 6 schematically depicts an optic 100 (herein also referred to as an optical system) that includes two optical components 102 and 104 that are optically coupled to one another. The optical component 102 is a light pipe that extends about an optical axis (OA) from a proximal end (PE) to a distal end (DE). The light pipe is configured to receive light from one or more light sources at its input surface 102a and to transmit the received light to its output surface 102b. Similar to the previous embodiments, the light pipe 102 exhibits a progressively increasing cross-sectional area from its input surface to its output surface (in another embodiment, the light pipe can have a substantially constant cross-sectional area). The optical component 104 receives, via a central portion 106a of its surface 106, the light exiting the light pipe (at least a portion of this light). A central reflective surface 108, which is in the form of an inverted conical surface, directs a portion of the light incident thereon, via reflection, to a lateral reflective surface 110, and another portion of the incident light to a peripheral portion 106b of the surface 106. The lateral reflective surface 110 reflects the light incident thereon, via TIR, specular reflection or a combination of the two, to an output surface 112 for exiting the optic. In some embodiments, a portion of the light reflected by the peripheral portion 106b (e.g., via TIR, specular reflection or both) reaches the output surface 112 directly and another portion of such reflected light reaches the output surface 112 via reflection at the lateral reflective surface 110.

Figure 7:
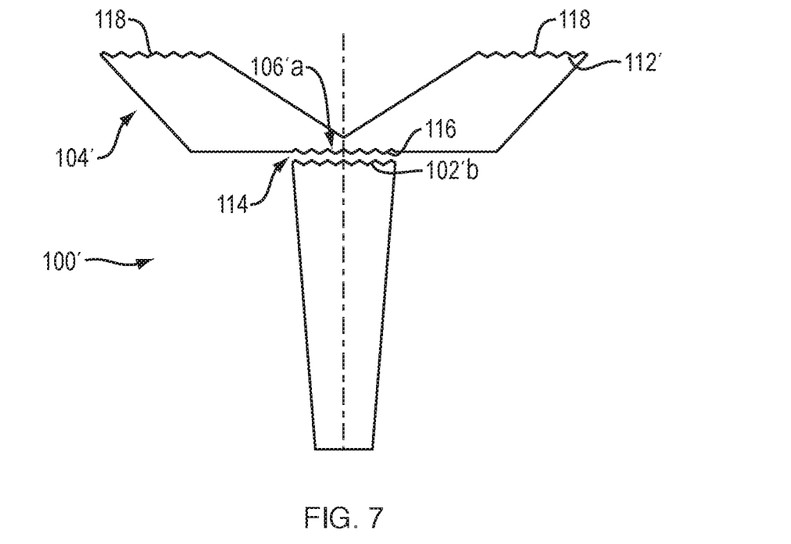
FIG. 7 is a schematic cross-sectional view of an embodiment of the optic of FIG. 6 in which a plurality of surfaces comprise microlenses.

In some embodiments of the above optic 100, the output surface 102(b) of the light pipe can comprise a textured surface and/or a plurality of micro lenses. Alternatively or in addition, the central portion 106a of the surface 106 of the optical element 104 and/or the output surface 112 thereof can comprise a textured surface and/or a plurality of microlenses. As noted above, this can improve mixing of the light rays. The improvement in light mixing can be advantageous in a variety of applications, such as color mixing. By way of example, FIG. 7 schematically depicts an optic 100' according to such an embodiment in which an output surface 102'b of the light pipe, a central portion 106'a of the optical element 104' and an output surface 112' of the optic comprise, respectively, a plurality of microlenses 114, 116, 118.

Those having ordinary skill in the art will appreciate that a variety of modifications can be made to the above embodiments without departing from the scope of the invention.

What is claimed is:

1. An optic, comprising
a light pipe having a polygonal cross-sectional shape and extending from a proximal end to a distal end about an optical axis, said light pipe being adapted to receive at its proximal end at least a portion of light emitted by a light source,
a central reflector having a reflecting surface with a plurality of undulations and being optically coupled to said distal end of the light pipe for receiving at least a portion of the light transmitted through the light pipe and for reflecting said received light,
a first and a second peripheral reflectors, wherein at least said first reflector is optically coupled to said central reflector for receiving at least a portion of said reflected light therefrom, and
an output surface,
wherein the first and the second peripheral reflectors are disposed at an angle relative to one another such that the first reflector reflects at least a portion of the light received from the central reflector to said second reflector and the second reflector is configured to redirect at least a portion of the light received from the first reflector to said output surface for exiting the optic.

2. The optic of claim 1, wherein said reflecting surface of the central reflector has an inverted conical shape.

3. The optic of claim 1, wherein said central reflector is configured to reflect at least a portion of the light from the light pipe via total internal reflection (TIR).

4. The optic of claim 1, wherein said first peripheral reflector comprises a lateral surface, said lateral surface being configured to receive at least a portion of the light reflected by the central reflector and to redirect said received light to said second peripheral reflector for exiting the optic.

5. The optic of claim 4, wherein said lateral surface of the first peripheral reflector is configured to redirect the received light to said output surface via TIR.

6. The optic of claim 5, wherein said second peripheral reflector is configured to redirect the received light along a direction substantially parallel to said optical axis.

7. The optic of claim 4, wherein said second peripheral reflector comprises a surface disposed at an angle relative to said lateral surface of the first peripheral reflector.

8. The optic of claim 7, wherein said surface of the second peripheral reflector is configured to redirect at least a portion of the received light via TIR.

9. The optic of claim 7, wherein said lateral surface of the first peripheral reflector is substantially perpendicular to said optical axis.

10. The optic of claim 4, wherein said output surface comprises a plurality of microlenses.

11. The optic of claim 4, wherein at least a portion of said output surface is textured.

12. The optic of claim 1, wherein said optic is formed as a single unitary piece.

13. The optic of claim 1, wherein said optic is formed of separate pieces positioned in optical coupling to one another.

14. The optic of claim 1, wherein said light source comprises any of a single LED, a plurality of LEDs, and one or more multi-LED chips.

15. The optic of claim 1, wherein said light source comprises two or more LEDs configured to emit light with different colors.

16. An optic, comprising
a light pipe having a polygonal cross-sectional shape and extending from a proximal end to a distal end about an optical axis, said light pipe being adapted to receive at its proximal end at least a portion of light emitted by a light source,
a central reflector having a reflecting surface and being optically coupled to said distal end of the light pipe for receiving at least a portion of the light transmitted through the light pipe and for reflecting said received light,
a first and a second peripheral reflectors, wherein at least said first peripheral reflector is optically coupled to said central reflector for receiving at least a portion of said reflected light therefrom, and
an output surface,
wherein the first and the second peripheral reflectors are disposed at an angle relative to one another such that the first reflector reflects at least a portion of the light received from the central reflector to the second reflector and the second reflector is configured to redirect at least a portion of the light received from the first reflector to said output surface for exiting the optic.

17. The optic of claim 16, wherein said reflecting surface of the central reflector has an inverted conical shape.

18. The optic of claim 16, wherein said central reflector is configured to reflect at least a portion of the light from the light pipe via total internal reflection (TIR).

19. The optic of claim 16, wherein said central and first and second peripheral reflectors are configured such that the light exiting the optic via the output surface is substantially parallel to said optical axis.

20. The optic of claim 19, wherein said first and second reflectors are configured such that the light exiting the optic exhibits a divergence characterized by a full width at half maximum (FWHM) less than about 15 degrees.

21. The optic of claim 16, wherein said output surface is textured and includes a plurality of microlenses.

22. The optic of claim 16, wherein said first peripheral reflector comprises a substantially flat surface positioned perpendicularly relative to said optical axis.

23. The optic of claim 16, wherein each of said peripheral reflectors comprises a reflective surface configured for reflecting at least a portion of the light incident thereon via total internal reflection.

\* \* \* \* \*